United States Patent [19]
Takaki

[11] Patent Number: 5,923,730
[45] Date of Patent: Jul. 13, 1999

[54] TEST OF A CALL CONNECTION IN AN INTELLIGENT NETWORK BY REFERRING TO ACCUMULATED CALL CONNECTIONS

[75] Inventor: Yoshishige Takaki, Tokyo, Japan

[73] Assignee: NEC Corporation, Japan

[21] Appl. No.: 08/866,715

[22] Filed: May 30, 1997

[30] Foreign Application Priority Data

May 31, 1996 [JP] Japan ................................. 8-138362

[51] Int. Cl.⁶ ........................... H04M 1/24; H04M 3/08; H04M 3/22
[52] U.S. Cl. .................................. 379/1; 379/10; 379/15
[58] Field of Search .............................. 379/1, 9–10, 12, 379/14–16, 22, 34

[56] References Cited

U.S. PATENT DOCUMENTS

| | | | |
|---|---|---|---|
| 4,464,543 | 8/1984 | Kline et al. ............................ | 379/247 |
| 5,241,580 | 8/1993 | Babson, III ........................... | 379/15 |
| 5,384,768 | 1/1995 | Fujii ...................................... | 379/15 |
| 5,579,371 | 11/1996 | Aridas et al. .......................... | 379/34 |
| 5,659,604 | 8/1997 | Beckmann ............................. | 379/34 |

FOREIGN PATENT DOCUMENTS

| | | |
|---|---|---|
| 4-129363 | 4/1992 | Japan . |
| 5-83375 | 4/1993 | Japan . |
| 62-178049 | 8/1997 | Japan . |

*Primary Examiner*—Curtis A. Kuntz
*Assistant Examiner*—Binh K. Tieu
*Attorney, Agent, or Firm*—Ostrolenk, Faber, Gerb & Soffen, LLP

[57] ABSTRACT

In order to automatically investigate correspondence between a call connection datum indicated by an originating call and a locus which the originating call transits through in an intelligent network, a call connection testing device comprises a memory in which a call information accumulating device accumulates a plurality of call connection data as stored connection data. So as to make a display control unit control an output device for display of the locus, a key is produced by a referring device to indicate the call connection datum and to produce as a produced connection datum one of the stored connection data that is accessed by the key.

14 Claims, 2 Drawing Sheets

TEST OF A CALL CONNECTION IN AN INTELLIGENT NETWORK BY REFERRING TO ACCUMULATED CALL CONNECTIONS

BACKGROUND OF THE INVENTION

This invention relates to test or investigation of a service function of an intelligent network and, more particularly, to a method of and a device for testing, as regards an originating call to be investigated, connection information in the intelligent network primarily as a route which the originating call transits through.

In the intelligent network, a telecommunication network is provided with intelligence, such as a control data base and a communication controlling processor, to combine the intelligence with a plurality of exchanges of various hierarchies, such as end centers, toll centers, sectional centers, and regional centers, dispersed in the telecommunication network. The intelligent network thereby raises receive capabilities of the telecommunication network.

As an example of services of the intelligent network, attention will be directed to a free dial service. A calling subscriber initiates an originating call by dialing a destination or called phone number as a logical number rather than as a physical number. Responsive to the originating call, an exchange refers to a conversion table kept in the data base so as to translate the logical number into the physical number, which the exchange uses in establishing an actual connection. It is possible in such a case to use the logical number in common to a plurality of source localities where the originating call is initiated. It therefore follows even when one and the same logical number is dialed on different occasions by the calling subscriber or by different calling attendants in various source localities that the logic number is translated dependent on the source localities into various physical numbers which may be in different destination localities and one of which the actual connection is established at a time through a geographic routing in the intelligent network.

In view of the foregoing, it is necessary to test such a service function of the intelligent network by investigating whether or not entries are correct in the data base and conversion or translation is correctly carried out. According to prior art, a number of state transitions or call connection data are accumulated, as call log information data, as regards their sources and destinations so as to make it possible in response to a display request command to display one of the state transitions that is requested by the command as a call connection datum.

For example, disclosed in Japanese Patent Prepublication (A) No. 83,375 of 1993 is an idea wherein the exchange makes a service control point (SCP) convert the logical number to a translated number and deals with the actual connection of the calling phone number to the translated number. The service control point serves as the intelligence and comprises an electronic digital computer composed of the data base and the communication controlling processor. Test of the geographical routing is carried out centrally at a predetermined one of the exchanges as regards the originating call that is delivered to an exchange in any locality. Incidentally, the translated number may be dependent on a time zone datum including a time instant at which the called phone number is dialed.

In a conventional call information testing method and a conventional device therefor described in the foregoing, it is indispensable for display of correspondence between the call connection datum of the originating call and a service scenario descriptive of the service function to manually desktopwise draw a locus on a sheet of paper on which the service scenario is preliminarily printed. As a consequence, it has been impossible to quickly visualize the call connection datum. This has given rise to a problem such that quick visual understandings are impossible as regards errors in the service scenario and an incorrect route which the originating call may run through. Another problem is such that maintenance of the intelligent network is deteriorated.

SUMMARY OF THE INVENTION

It is consequently a principal object of the present invention to provide a call information method of testing in an intelligent network a call connection datum indicative of an originating call to be investigated, which method is capable of automatically quickly either displaying on a display unit a route which the originating call runs through in the intelligent network or printing out the route on a sheet of paper.

It is another principal object of this invention to provide a method which is of the type described and by which it is readily possible to find an incorrect route passed through in the intelligent network by the originating call.

It is still another principal object of this invention to provide a method which is of the type described and which can raise a maintenance capability of the intelligent network.

It is yet another principal object of this invention to provide a method which is of the type described and can automatically quickly produce a call connection state of the originating call.

It is a subordinate object of this invention to provide a method of the type described and in which a service scenario indicates its service function and the geographic route in drawn on a flow chart representation of the service scenario.

It is another subordinate object of this invention to provide a method which is of the type described and by which it is readily possible to find errors in such service scenarios.

It is still another subordinate object of this invention to provide a method which is of the type described and in which the originating call is specified by a calling phone number with an end office symbolization and a called phone number to enable display of a geographic routing of the originating call through the intelligent network.

It is yet another subordinate object of this invention to provide a method which is of the type described in the foregoing and in which the originating call is specified further by a time zone datum including a time instant, at which the originating call is initiated, to enable display of a time zone routing of the originating call through the intelligent network in addition to the geographic routing.

It is a different object of this invention to provide a call information testing device for implementing the method of the type described.

Other objects of this invention will become clear as the description proceeds.

In accordance with an aspect of this invention, there is provided a method of testing in an intelligent network a call connection datum indicative of an originating call to be investigated, comprising the steps of: (A) accumulating a plurality of call connection data in a memory as stored connection data, (B) referring to the memory by a key indicative of the call connection datum to produce as a produced connection datum one of the stored connection data that is accessed by the key, and (C) displaying the produced connection datum on an output device.

In accordance with a different aspect of this invention, there is provided a device for testing in an intelligent network a call connection datum indicative of an originating call to be investigated, comprising: (A) a memory, (B) an output device, (C) accumulating means for accumulating a plurality of call connection data for storage in the memory as stored connection data, (D) referring means for referring to the memory by a key indicative of the call connection datum to produce as a produced connection datum one of the stored connection data that is accessed by the key, and (E) display energizing means responsive to the produced connection datum for making the display unit display the produced connection datum on the output device.

DESCRIPTION OF THE PREFERRED EMBODIMENT

Figure 1:
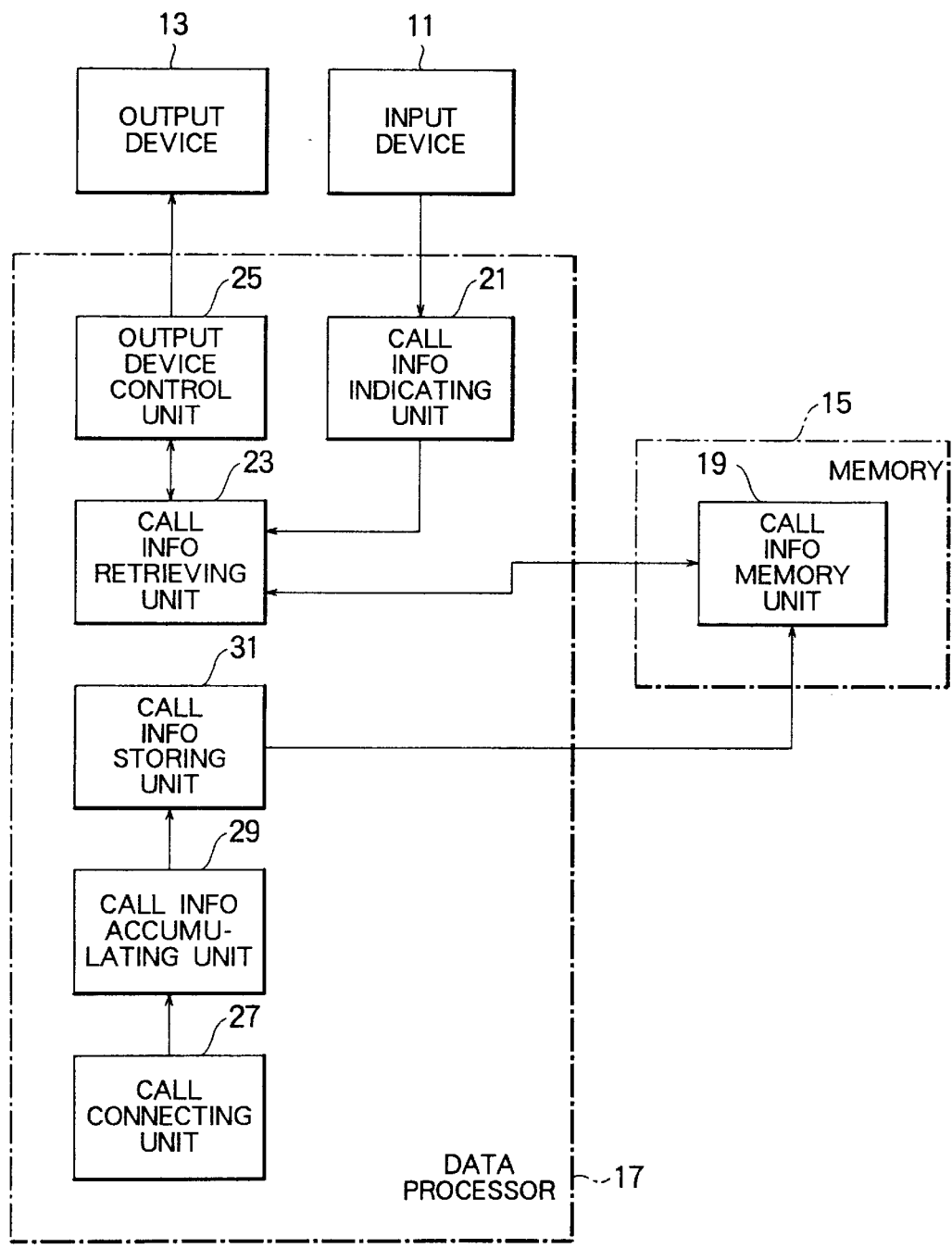
FIG. 1 is a functional block diagram of a call connection testing device according to an embodiment of the instant invention.

Referring to FIG. 1, the description will begin at a call connection testing device according to a preferred embodiment of this invention. The device is used in an intelligent network and comprises a call connection data input device 11 which comprises in turn a keyboard machine and a mouse (both not shown) for producing a call connection datum indicative of an originating call to be investigated. The call connection datum comprises a calling phone number and a called phone number to specify in combination the originating call. The called phone number may be a logic number rather than a physical number. It follows therefore as pointed out hereto before that the calling phone number is accompanied by an end office symbolization or representation which may be a numeric number or an alphabetical representation. A data output device 13 comprises a display unit and/or a printer (both not shown). The intelligent network includes a data base (not shown) for translating the called phone number into a translated number and has various service functions, such as establishing an actual connection between terminal instruments of the calling and the called "phone" number of the originating call.

The call connection testing device further comprises a memory 15 and a data processor 17 connected to the input device 11, the output device 13, and the memory 15 to collect a plurality of call connection data for storage in a call information memory unit 19 of the memory 15 as stored connection data and to produce a produced connection datum in response to the call connection datum of the originating call. The memory 15 has a remaining part in which is stored a program for keeping the data processor 17 in operation. The data processor 17 comprises a call information indicating unit 21 for indicating the originating call as an indicated call representative of the call connection datum. Responsive to the indicated call, a call information retrieving unit 23 compiles a key indicative of the call connection datum to send the key to the call information memory unit 19 and thereby to get as a retrieved connection datum one of the stored connection data that is accessed by the key in the call information memory unit 19.

The stored connection data are call log information data accumulated in the manner which will presently be described. Each of the stored connection data represents one of factors that activates a state transition of the originating call in the intelligent network from a feature name indicated by a box of a service scenario indicative of the service function for the originating call to a next succeeding feature name. Connected to the output device 13 and the call information retrieving unit 23, an output device control unit 25 delivers the retrieved connection datum to the output device 13 as the produced connection datum and controls the output device 13 to make the same display the produced connection datum by the use of the produced connection datum. For example, the output device visually displays on a flow chart representation of the service scenario as a locus a geographic route through which the originating call runs or transits in the intelligent network. Alternatively, the output device 13 displays the locus together with the flow chart representation on a sheet of papers by print out.

It is possible to make the input device 11 indicate the call connection datum which further indicates as a time zone datum a time instant of, for example, the year at which instant the original call is initiated and which is either included or not in a time interval of the time zone datum, such as either hours of a day or days of the year. In this event, each stored connection datum additionally specifies the time zone datum. The data base translates the called phone number into a translated number which depends on the time zone datum to make a charging device (not shown) of the intelligent network charge a different fee per unit time to the originating call. The output device 13 displays or prints out a geographic and time zone route which the originating call passes through in the intelligent network.

In the data processor 17, a call connecting unit 27 establishes actual call connection from time to time to produce a plurality of actual connection data in response to various calls which may be supplied from the input device 11 through a connection omitted from the illustration merely in order to simplify the drawing. Every time when produced, the actual connection data are accumulated or collected by a call information accumulating unit 29 as accumulated connection data. Connected to the call information memory unit 19, a call information storing unit 31 stores the accumulated connection data in the latter as the stored connection data. If the call information retrieving unit 23 can not search the call connection datum of the originating call in the stored connection data, the call information retrieving unit 23 makes the call connecting unit 36 through a connection (not shown) establish a fresh actual connection to make the call information storing unit 31 add an additional connection datum to the stored connection data.

Figure 2:
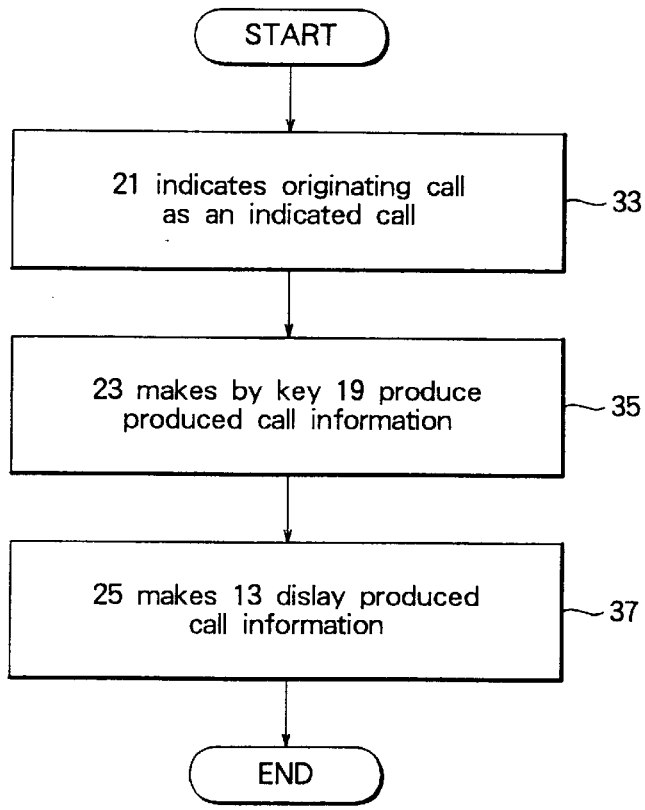
FIG. 2 shows a flow chart illustrative of a call connection data displaying operation of the device depicted in FIG. 1.

Referring to FIG. 2 and continuously to FIG. 1, operation of the call information testing device of FIG. 1 is as follows. A call connection data displaying operation starts when the data input device 11 produces an originating call which should be investigated by the device. At a first primary step 33, the call information indicating unit 21 indicates an indicated call representative of the originating call as a call connection datum which comprises the calling and the called phone numbers and, as the case may be, the time instant at which the originating call is initiated either in the time zone inclusive or out of the time zone exclusive. At a second primary step 35, the call information retrieving unit 23 uses the call connection datum in compiling the key to deliver the key to the call information memory unit 19. In response, the call information retrieving unit 23 gets the retrieved connection datum from the call information memory unit 19. At a third primary step 37, the output device control unit 25 sends the retrieved connection datum to the data output device 13 as the produced connection datum to make the output device 13 display the geographic route either without or together with the time zone route. This process thereby comes to an end. The retrieved call connection datum is transferred from the call information retrieving unit 23 to the output device control unit 25 as the produced connection datum while being retrieved from the call information memory unit 19. Alternatively, the retrieved connection datum may be transferred to the output device control unit 25 after having wholly been retrieved from the call information memory unit 19. This nevertheless does not substantially adversely affect quick investigation of the originating call.

Figure 3:
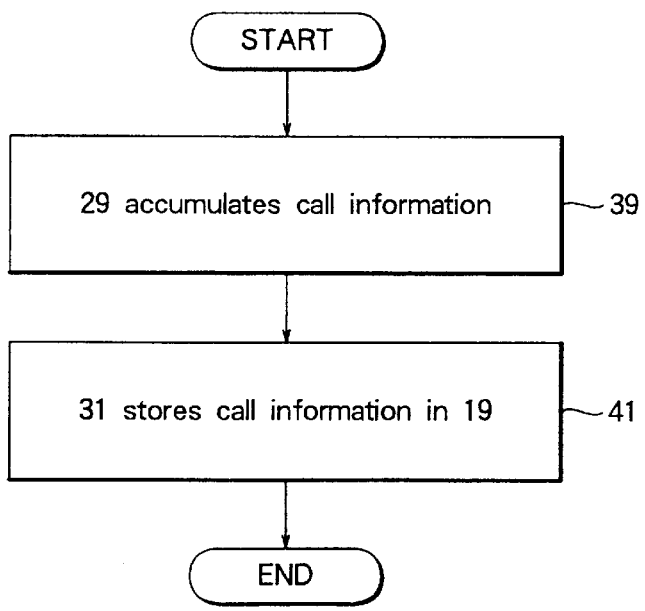
FIG. 3 shows a flow chart illustrative of a call connection data storing process which is used in the call connection data displaying operation mentioned in conjunction with FIG. 2.

Turning to FIG. 3 with FIG. 1 continuously referred to, the description will proceed to a call connection data storing process carried out by the data processor 17. Prior to the operation illustrated with reference to FIG. 2, this process preliminarily starts. At a first secondary step 39, the call connecting unit 27 either actually or as a simulation establishes call connections from time to time through the intelligent network for various calling and called numbers and in different time zones with each call connection established between a calling and a called phone number at a time instant of initiation of an originating call. In the meantime, the call information accumulating unit 29 collects or accumulates the accumulated connection data (including the call log information data) at this first secondary step 39. At a second secondary step 41, the call information storing unit 31 stores the call log information data in the call information memory unit 19. The call connection data storing process comes to an end.

While this invention has thus far been described in specific conjunction with a preferred embodiment thereof, it is now understood that a call information testing device comprises according to this invention a service control point (SCP) which accumulates call connection information. An originating call is used as a key for retrieving this accumulated call information as an object which should be investigated. The call information testing device further comprises a service extracting point (SCEP) for displaying the call connection information, extracted by the key, on a flow chart representation of a service scenario of a service of the intelligent network as a route which the originating call passes through. When the printer is used as the data output device 13, the flow chart representation is printed on the paper.

What is claimed is:

1. A method of testing in an intelligent network a call connection datum indicative of an originating call to be investigated, the method comprising the steps of:

accumulating a plurality of call connection data in a memory as stored connection data;

compiling a key for each call connection datum and indicative of a respective call connection datum;

using said key indicative of a respective call connection datum to access said memory to produce as a produced connection datum one of said stored connection data that is accessed by said key; and displaying said produced connection datum on an output device.

2. A method as claimed in claim 1, wherein said call connection datum comprises a calling phone number with an end office symbolization and a called phone number to specify in combination said originating call, said produced connection datum representing on said output device a geographic route which said originating call transits through in said intelligent network.

3. A method as claimed in claim 2, wherein said call connection datum further comprises, as a time zone datum to specify in addition said originating call, a time instant at which said called phone number is dialed, said produced connection datum representing on said output device additionally a time zone route which said originating call transits through in said intelligent network.

4. A method as claimed in claim 1, wherein said accumulating step accumulates said call connection data as call log information data representative of factors for activating a transition of said originating call from a feature name indicated by a box of a service scenario to a next succeeding feature name.

5. A method as claimed in claim 4, wherein said displaying step makes said output device display said produced connection datum on a flow chart display of said service scenario as a locus which said originating call transits through in said intelligent network.

6. A method as claimed in claim 5, wherein said call connection datum comprises a calling phone number with an end office symbolization and a called phone number to specify in combination said originating call, said produced connection datum representing by said locus on said flow chart display a geographic route which said originating call transits through in said intelligent network.

7. A method as claimed in claim 6, wherein said call connection datum further comprises, as a time zone datum to specify in addition said originating call, a time instant at which said called phone number is dialed, said produced connection datum representing by said locus on said flow chart display additionally a time zone route which said originating call transits through in said intelligent network.

8. A device for testing in an intelligent network a call connection datum indicative of an originating call to be investigated, comprising:

a memory;

an output device;

accumulating means for accumulating a plurality of call connection data for storage in said memory as stored connection data;

a key generator generating a respective key associated with each call connection datum;

referring means for referring to said memory by a respective key indicative of said call connection datum to produce as a produced connection datum one of said stored connection data that is accessed by said key; and display control means responsive to said produced connection datum for making said output device display said produced connection datum.

9. A device as claimed in claim 8, wherein said call connection datum comprises a calling phone number with an end office symbolization and a called phone number to specify in combination said originating call, said display control means making said output device display said produced connection datum as a geographic route which said originating call transits through in said intelligent network.

10. A device as claimed in claim 8, wherein said call connection datum further comprises, as a time zone datum to specify in addition said originating call, a time instant at which said called phone number is dialed, said display control means making said output device display said produced connection datum additionally as a time zone route which said originating call transits through in said intelligent network.

11. A device as claimed in claim 8, wherein said accumulating means accumulates said call connection data as call log information data representative of factors for activating a transition of said originating call from a feature name indicated by a box of a service scenario to a next succeeding feature name.

12. A device as claimed in claim 11, wherein said display control means makes said output device display said produced call datum on a flow chart display of said service scenario as a locus which said originating call transits through in said intelligent network.

13. A device as claimed in claim 12, wherein said call connection datum comprises a calling phone number with an end office symbolization and a called phone number to specify in combination said originating call, said display control means making said output device display said produced connection datum on said flow chart display as a geographic route by a locus which said originating call transits through in said intelligent network.

14. A device as claimed in claim 12, wherein said call connection datum further comprises, as a time zone datum to specify in addition said originating call, said display control means making said output device display said produced connection datum additionally as a time zone route on said flow chart display by a locus which said originating call transits through in said intelligent network.

* * * * *